Figure 1:
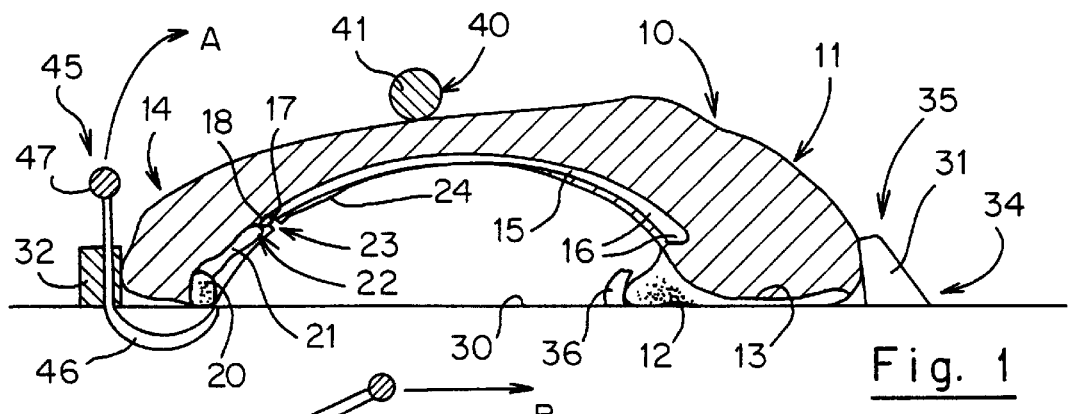

United States Patent
Heidke et al.

Patent Number: 5,868,613
Date of Patent: Feb. 9, 1999

[54] MEAT DEBONING

[75] Inventors: Darryl John Heidke, Morningalde; Phillip Rodney Boyce, Murrarrie; Peter Joseph Aust, Carina, all of Australia

[73] Assignees: Meat Research Corporation, Sydney; Commonwealth Scientific & Industrial Research Organisation, Cambell, both of Australia

[21] Appl. No.: 750,631
[22] PCT Filed: Jun. 16, 1995
[86] PCT No.: PCT/AU95/00361
§ 371 Date: Dec. 16, 1996
§ 102(e) Date: Dec. 16, 1996
[87] PCT Pub. No.: WO95/34215
PCT Pub. Date: Dec. 21, 1995

[30] Foreign Application Priority Data
Jun. 16, 1994 [AU] Australia ............... PM6295

[51] Int. Cl.⁶ .................... A22C 17/04
[52] U.S. Cl. .................... 452/135; 452/171
[58] Field of Search .................... 452/135, 128, 452/136, 171

[56] References Cited

U.S. PATENT DOCUMENTS

| | | |
|---|---|---|
| 3,122,780 | 3/1964 | Segur . |
| 3,553,766 | 1/1971 | Herubel .................... 452/135 |
| 4,299,009 | 11/1981 | Tournier . |
| 4,543,689 | 10/1985 | Couture . |
| 5,226,850 | 7/1993 | Klaasen .................... 452/135 |
| 5,295,896 | 3/1994 | Petersen .................... 452/135 |
| 5,494,480 | 2/1996 | Passchier .................... 452/135 |

FOREIGN PATENT DOCUMENTS

| | | |
|---|---|---|
| 61152/65 | 7/1965 | Australia . |
| 51381/69 | 3/1969 | Australia . |
| A1-77871/81 | 11/1981 | Australia . |
| A-84183/82 | 5/1982 | Australia . |
| 0159826A1 | 3/1985 | European Pat. Off. . |
| 87/13900 | 10/1987 | France . |
| 88/08250 | 11/1988 | WIPO . |
| 91/11912 | 8/1991 | WIPO . |
| 92/01385 | 2/1992 | WIPO . |
| 93/20703 | 10/1993 | WIPO . |
| 94/02024 | 2/1994 | WIPO . |

*Primary Examiner*—Willis Little
*Attorney, Agent, or Firm*—McDermott, Will & Emery

[57] ABSTRACT

A process and apparatus for the removal of ribs (15) from a carcass section (10) which contains a spine portion (11) and a number of ribs (15), comprises grasping a section of tissues (14) in the vicinity of the ventral extremities (17) of the ribs (15), pulling the grasped section of tissues (14) in a direction (A) transverse to the ribs and away from the ventral extremities (17) so that end regions (19) of the ribs (15) near the ventral extremities (17) are exposed, and restraining the exposed end regions (19) and further separating tissues attached to the ribs (15) so as to progressively expose the ribs along a major proportion of their lengths. Tissue attachments between the grasped section of tissues (41) and the ribs (15) at the ventral extremities (17) of the ribs where initial exposure of the ribs (15) is desired are first weakened by forming a cut (23) between the cartilage (18) attached at the ventral extremity (17) of each rib (15) and the respective ventral extremity (17) of the rib. A lateral restraint (40) engages the carcass section (10) and moves with a rolling contact along the carcass section towards the spine portion (11) during progressive exposure of the ribs.

14 Claims, 1 Drawing Sheet

MEAT DEBONING

This invention relates to removal of bones from carcass sections.

In the processing of meat sections, commercial purchasers frequently specify when ordering meat cuts that they require the meat to be shipped with the bones or certain specified bones removed. In the case of sections of meat carcass containing ribs, recovery of meat from the rib area is usually a manual operation in which meat on the outside of the ribs is progressively trimmed from the ribs. This leaves significant amounts of intercostal meat between the ribs which is subsequently removed by using a boning knife to cut down an edge of each rib and back up against the adjacent rib. These processes still leave fragments of meat attached to the ribs and these fragments are also manually recovered as low value meat scraps. Because of the high labour investment, it is quite costly to recover meat from the rib area of a carcass.

Automated or semi-automated processes for removing ribs from animal carcasses or sections of carcass have been proposed. For example, in patent specification No. PCT/AU91/00172 by the present applicants, there is described a process and apparatus for removing ribs from a carcass which has had the brisket cut but has not been split along the spine. Most abattoirs are set up to split a carcass before boning operations are commenced so that implementation of the process and apparatus described in this prior patent specification may necessitate changes in the carcass processing operations.

In patent specification Nos. PCT/NL90/00128 and PCT/NL92/00143, both in the name of Passchier, there are described processes and apparatus for separating ribs from carcass sections. The proper functioning of the apparatus in these patent specifications would appear to require substantially uniform sized pieces of carcass sections which are quite accurately located and oriented. Also the carcass sections must already have been processed so that there are substantially free extremities of the ribs at one edge of the section. In one of the two Passchier specifications, the ribs are broken along their length so that this can lead to bone splinters appearing in the meat.

It is an object of the present invention to provide a process and apparatus suitable for removing ribs from a carcass section in a mechanised way.

It is a further and preferred object of the present invention to provide a method and apparatus for effectively removing ribs from a carcass section and which is capable of processing standard carcass sections.

According to the present invention there is provided a process for the removal of ribs from a carcass section which contains a spine portion and a number of ribs, the ribs having dorsal ends adjacent to the spine portion and ventral extremities remote from the spine portion, the process comprising the steps of:

grasping a section of tissues of the carcass section in the vicinity of the ventral extremities of the ribs, p1 weakening tissue attachments between the grasped section of tissues and the ribs at the ventral extremities of the ribs by forming a cut transverse to each rib to weaken the attachment between the cartilage attached at the ventral extremity of each rib and the respective ventral extremity of the rib, pulling the grasped section of tissues in a direction transverse to a line extending generally from the ventral extremities to the dorsal ends of the ribs and away from the ventral extremities so that the grasped section of tissues separate from and thereby expose end regions of the ribs near the ventral extremities, and restraining the exposed end regions and further separating tissues attached to the ribs so as to progressively expose the ribs along a major proportion of their lengths so as to enable separation of the exposed ribs from the tissues that have been pulled therefrom.

The process and apparatus of the present invention have been particularly developed for processing of a beef carcass section, particularly either a fore quarter section of a side of beef or an entire side of beef containing a spine portion, ribs extending from the spine portion and a brisket section adjacent the ventral extremities of the ribs. It will be convenient to generally describe the invention in relation to processing of a beef carcass rib section, but the invention is not limited to this particular field of use.

The process of the invention includes some preparation steps which may be carried out manually, while the subsequent grasping, pulling and restraining steps are mechanised operations.

The step of weakening the tissue attachments comprises forming a cut to weaken the attachment between the cartilage attached at the ventral extremity of each rib and the respective ventral extremity of the rib. It is not necessary that this cutting step comprise completely severing attachment between that cartilage and the ventral extremity of the respective rib. In a beef carcass, the brisket has attached thereto the costal cartilages which extend towards the ventral extremities of the respective ribs. At the dorsal end of each costal cartilage there is located a joint known as the diarthordial joint, this joint being between the costal cartilage and the cartilage attached at the ventral extremity of each rib. This joint allows limited movement of the respective rib relative to the brisket, e.g. during expansion and contraction of the rib cage during breathing. It has been found preferable to form a preliminary cutting operation between the ventral extremity of each rib and the attached cartilage, rather than through the diarthordial joint, since it has been found that during the pulling of the grasped tissue section away from the ventral extremities, the muscles or meat tissues which are attached to the cartilage at the ventral extremity of each rib are more effectively pulled away from and separated from the rib.

The process may include the further step of clearing tissues along the medial or inner surface of each rib before carrying out the pulling and restraining steps. The step of clearing tissues may comprise forming a cut along a substantial part of the length of each rib including along a part of the length of each rib in the vicinity of the ventral end thereof The tissue covering the medial surface of the rib is known as the periosteum. This membrane can be quite stiff, particularly if the carcass section has been chilled before the boning operation which is a most common practice in the meat industry. The cutting of the periosteum, and preferably also at least a partial clearing of the periosteum from the medial surface of each rib, enables chilled carcass sections to be boned according to the present invention.

The step of grasping a section of tissues at the ventral extremities may comprise grasping the brisket and/or tissues surrounding the brisket of the carcass section whereby the brisket, costal cartilages, diarthordial joints, the cartilages attached at the ventral extremities of the ribs, and the surrounding and attached soft tissues all separate from the ventral extremities of the ribs so that the end regions are exposed. This initial exposure of the ventral extremities is facilitated with the preliminary cutting of the periosteum and at least partial clearing thereof from the medial surfaces of the ribs.

The step of pulling the grasped section of tissues preferably comprises pulling laterally outwardly generally orthogonally to the line extending from the ventral extremities of the ribs to the dorsal ends of the ribs and subsequently pulling in a direction which includes at least a component of the direction of the pulling force in a direction back along the general line of the ribs towards their dorsal ends and the spine portion, whereby the meat and other tissues are peeled away from the ribs in a direction outwardly and back towards the dorsal ends and spine portion.

During the step of pulling the grasped section of tissues to expose the end regions of the ribs, the carcass section is preferably restrained against movement generally in the direction of the pulling force by engaging the carcass section with a lateral restraint. The lateral restraint preferably engages the carcass section with a rolling contact, the restraint being moved along the carcass section towards the spine portion during the further separation of tissues and progressive exposure of the ribs.

The step of restraining the exposed end regions of the ribs preferably comprises clamping the exposed regions so as to securely hold the end regions during the step of further separating tissues and exposure of the major proportion of the lengths of the ribs.

The present invention also provides apparatus for the removal of ribs from a carcass section which contains a spine portion and a number of ribs, the ribs having dorsal ends adjacent to the spine portion and ventral extremities remote from the spine portion, the apparatus comprising:

grasping and pulling means for grasping a section of tissues of the carcass section in the vicinity of the ventral extremities of the ribs, and for pulling the grasped section of tissues in a direction transverse to a line extending generally from the ventral extremities to the dorsal ends of the ribs and away from the ventral extremities so that the grasped section of tissues separate from end regions of the ribs near the ventral extremities whereby the end regions are exposed, and restraining means for restraining the exposed end regions while the grasping and pulling means further separates tissues attached to the ribs so as to progressively expose the ribs along a major proportion of their lengths so as to enable separation of the exposed ribs from the tissues that have been pulled therefrom.

The apparatus may also include clamping means for restraining the carcass section against undesired movement, the clamping means comprising a spine clamp for clamping and holding the spine portion during operation of the grasping and pulling means. In one possible embodiment, there may be provided a support surface upon which the carcass section is initially placed, the spine clamp including a projection with projects from the support surface and is movable so as to engage with the spine portion and to push against the spine portion until the carcass section moves along the support surface and into engagement in the region of the brisket with a limit stop, the spine clamp further including a jaw which engages with the spine portion so as to clamp the spine portion between the jaw and the projection after the brisket region of the carcass section has engaged with the limit stop.

Alternatively, there may be provided support means for supporting the carcass section so that it is suspended with the line from the ventral extremity of each rib to the respective dorsal end of the rib being horizontal, the grasping and pulling means being operative to pull the grasped section of tissues in a generally horizontal direction to expose the ventral extremities of the ribs.

The apparatus may include a lateral restraint which engages against the carcass section to restrain the ribs from moving in the direction of the pulling force applied by the grasping and pulling means.

Preferably the lateral restraint comprises a roller which is moved along the carcass section with a rolling contact and towards the spine portion during the further separation of tissues and progressive exposure of the ribs.

The grasping and pulling means may include hook means operative to engage in and pierce into the soft tissues in the vicinity of the brisket and costal cartilages so as to thereby grasp the tissue section and pull the tissue section away from the ventral extremities of the ribs.

The restraining means may comprise rib clamp means comprising opposed clamping jaws which can be selectively closed so as to securely clamp and restrain the end regions of the ribs.

Figure 2:
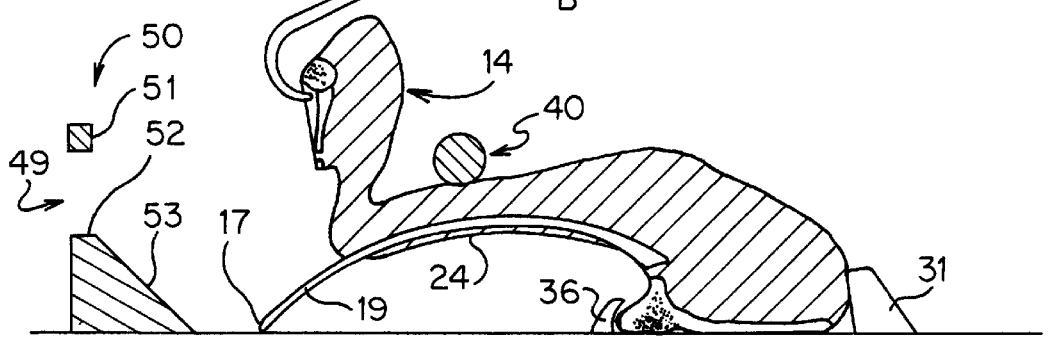
Figure 3:
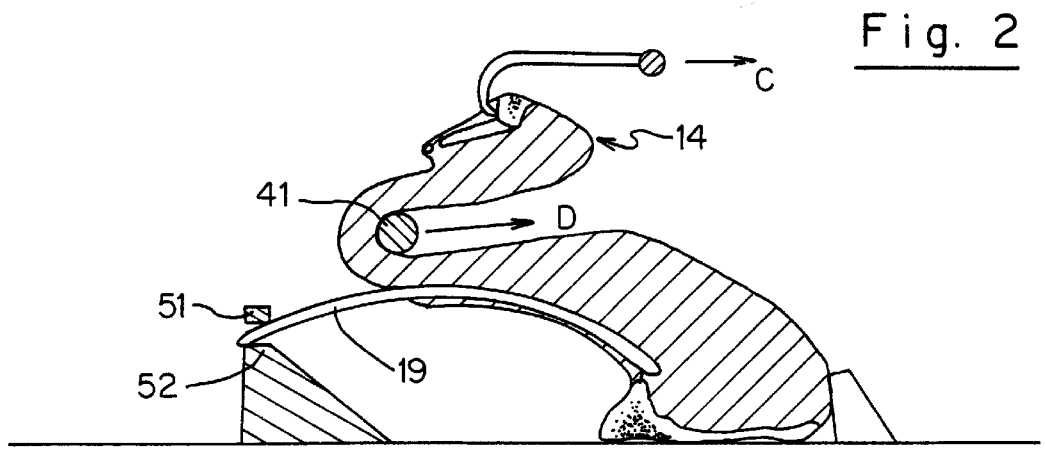
Figure 4:
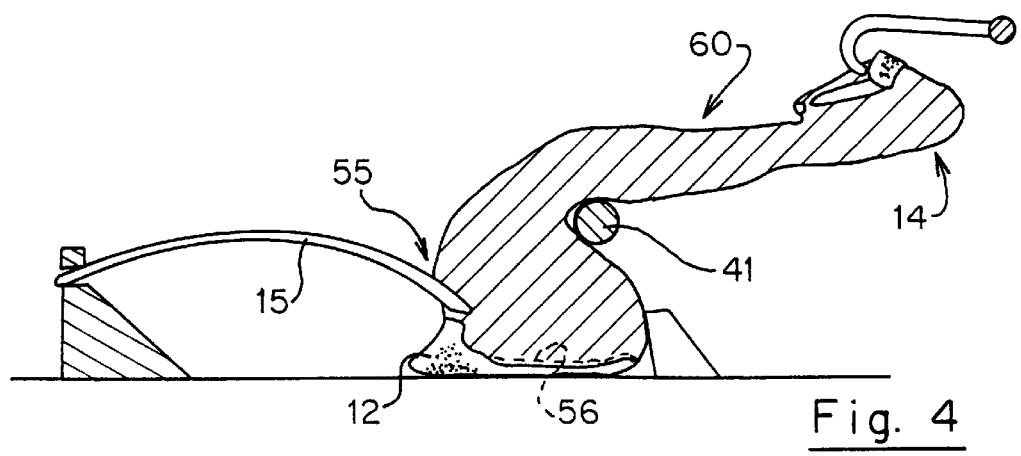

Possible and preferred features of the present invention will now be described with particular reference to the accompanying drawings. However it is to be understood that the features illustrated in and described with reference to the drawings are not to be construed as limiting on the scope of the invention. In the drawings:

FIG. 1 shows schematically in side sectional view apparatus according to the present invention, and FIGS. 2 to 4 shows sequential stages of a boning operation using the apparatus of FIG. 1.

In the drawings there is shown a carcass section 10, shown as a fore quarter of beef (fore leg removed), having a spine portion 11 containing the split vertebra 12 and feather bone 13. Rib 15 has a dorsal end 16 jointed to the spine and a ventral extremity 17. Initially strongly attached to the ventral extremity 17 is a cartilage 18. The brisket 20 has attached thereto the costal cartilage 21 which connects to the cartilage 18 at the diarthordial joint 22.

In a preliminary preparation a partial cut 23 is performed to sever or weaken the connection between the cartilage 18 and the ventral extremity 17 of each rib 15. Also a cut can be made along the medial surface of each rib 15 so as to split the periosteum 24 which may be also at least partially cleared from the medial surface of each rib 15, particularly towards the ventral extremity 17. It is not necessary that the cartilage 18 is separated from the extremity 17 of the rib, but it is strongly preferable to form the cut accurately between the extremity 17 and the cartilage 18 so that none of the cartilage 18 remains attached to the extremity 17 during the separation stage. If the cut 23 is spaced from the extremity 17, meat or other soft tissues may remain attached to the fragment of cartilage 18 remaining attached to the extremity 17.

The carcass section 10 is placed on the support surface 30 and can be advanced to the boning station, e.g. by providing projection 31 which can be movable in the direction from right to left in FIG. 1. The projection 31 pushes against the spine portion 11 until section 14 containing the brisket 20 engages with the limit stop 32. At this point, the carcass section can be restrained against movement firstly by providing a clamping means 34 operating as a spine clamp 35 which comprises the projection 31 and a jaw 36 which can be initially retracted below the surface of the support surface 30 but which is raised and advanced from left to right in FIG. 1 to engage with the spine portion 11 and, in co-operation with the projection 31, securely clamp the spine portion 11.

The apparatus also includes a lateral restraint 40 shown as a transverse bar or roller 41 which is brought downwardly into contact with the carcass section 10 approximately midway along the lengths of the ribs 15. The bar or roller 41 is firmly pressed downwardly against the carcass section to restrain the ribs 15 from being lifted upwardly during subsequent operations.

The apparatus also includes grasping and pulling means 45 which comprises one or more hooks 46 mounted along transverse bar 47. Initially the hooks 46 are located so that the points are at or below the support surface 30 in proximity to the limit stop 32. The pulling means 45 is lifted from the position shown in FIG. 1, i.e. orthogonally to the general line from extremity 17 to dorsal end 16, and is then also moved back generally towards the spine portion 11 as shown by the curved path of arrow A. As shown in FIG. 2, the hooks 46 engage with and pierce into the soft tissues in the vicinity of the brisket 20 and costal cartilages 21 so as to grasp the section of tissues 14. The movement of the hooks 46 can be effected by any suitable drive means (not shown) acting through the bar 47. The hooks 46 serve to grasp the tissue section 14 including the brisket 20, costal cartilages 21, cartilages 18 and surrounding meat and other soft tissues, and to pull this tissue section 14 away from the ventral extremities 17 of the ribs 15. The cartilages 18 separate from the ventral extremities 17 and this is facilitated if a preparatory cut 23 has been formed. As shown in FIG. 2, the soft tissues, including meat portions, and including intercostal meat and the periosteum, pull away from the ribs 15 at their ventral ends leaving exposed rib end regions 19.

At approximately the position in FIG. 2, the motion of the grasping and pulling means 45 can be temporarily stopped and the limit stop 32 can be retracted. The jaw 36 can also be retracted if desired at this time. The carcass section 10 can then be advanced, e.g. by movement of the projection 31 to the left in FIG. 2, towards restraining means 49 shown as rib clamp means 50. The rib clamp means 50 includes an upper jaw 51 and lower jaw 52. Leading up to lower jaw 52 is a ramp surface 53 so that as the carcass section 10 is advanced, the ventral ends 17 of the ribs will ride up the ramp surface 53 and into the space between the initially opened jaws 51, 52. Alternatively, the rib clamp means 50 can be advanced to the right from the position shown in FIG. 2 to achieve the same effect. When the exposed rib end regions 19 are located between the jaws 51, 52, those jaws can be closed as shown in FIG. 3 so as to securely clamp and hold the exposed rib end regions 19. The grasping and pulling means 45 can then continue to be moved in the direction of arrow B in FIG. 2 and arrow C in FIG. 3. When the meat and other grasped tissues 14 have been peeled back from the ribs to the lateral restraint 40, the bar or roller 41 constituting the lateral restraint can be then moved in the direction of arrow D as shown in FIG. 3 so that the meat and other tissues continue to be peeled back away from the ribs 15. A roller 41 which rolls along the outer surface of the carcass section is preferred to avoid damage to the tissues. A bar 41 may also cause excessive friction or drag.

When the general position shown in FIG. 4 is reached, cutting of the meat and other grasped tissues 60 away from the ribs 15 and vertebra 12 can be carried out as an auxiliary operation, e.g. by cutting means (not shown) introduced into the region 55. This final cutting to separate the grasped meat and other tissues if desired can be carried out manually. To assist at this stage in final separation of the boned out tissue section 60 to be recovered from the ribs 15 and vertebra 12, a preliminary cut may be formed along the lateral surfaces of the feather bones 13 as shown by the numeral 56 in FIG. 4. This is a standard cut used in boning operations and can be carried out before the carcass section 10 is advanced to the boning station.

Although illustrated and described in relation to boning of a fore quarter meat section on a horizontal support surface 30, the process and apparatus are useable with other meat sections and in other orientations. For example, an entire side of a split carcass, such as a beef carcass, can be hung by the hind leg from an overhead rail in conventional fashion, and the process carried out on that side while hanging vertically. There is no need for the support surface 30 in this orientation, but the spine 12 can be clamped by means 34, the roller 41 can be engaged across the ribs 15, and the grasping and pulling means 45 can be substantially the same in operation as the embodiment illustrated. Two mirror image apparatuses can be provided for left and right side meat sections.

Using the preferred process and apparatus described and illustrated in relation with the drawings, the ribs 15 at the end of the processing operation are substantially clear of meat and other tissues, except possibly for small fragments at the dorsal ends 16 adjacent to the spine portion 11. It is expected there will be some meat fragments remaining attached to the vertebra 12 and feather bones 13, e.g. meat in between adjacent feather bones 13, and such meat can be covered by conventional manual methods for recovering scrap meat. However a significantly greater proportion of meat can be recovered in the boned out tissue section 60 than achievable with manual boning methods. The method and apparatus can therefore enable reduction in the labour involved in recovering meat and can also enable an improvement in the proportion of meat recovered or at least a greater proportion of higher valued meat cuts being recovered.

It is to be understood that various alterations, modifications and/or additions may be made to the features of the possible and preferred embodiment(s) of the invention as herein described without departing from the scope of the invention as defined in the claims.

We claim:

1. A process for the removal of ribs from a carcass action which contains a spine portion and a number of ribs, the ribs having dorsal ends adjacent to the spine portion and ventral extremities remote from the spine portion, the process comprising the steps of:

grasping a section of tissues of the carcass section in the vicinity of the ventral extremities of the ribs, weakening tissue attachments between the grasped section of tissues and the ribs at the ventral extremities of the ribs by forming a cut transverse to each rib to weaken the attachment between the cartilage attached at the ventral extremity of each rib and the respective ventral extremity of the rib;

pulling the grasped section of tissues in a direction transverse to a line extending generally from the ventral extremities to the dorsal ends of the ribs and away from the ventral extremities so that the grasped section of tissues separate from and thereby expose end regions of the ribs near the ventral extremities, and restraining the exposed end regions and further separating tissues attached to the ribs so as to progressively expose the ribs along a major proportion of their lengths so as to enable separation of the exposed ribs from the tissues that have been pulled therefrom.

2. A process as claimed in claim 1, further comprising the step of clearing tissues along the medial or inner surface of each rib before carrying out the pulling and restraining steps.

3. A process as claimed in claim 2, wherein the step of clearing tissues comprises forming a cut along a substantial part of the length of each rib including along a part of the length of each rib in the vicinity of the ventral end thereof.

4. A process as claimed in claim 1, wherein the step of grasping a section of tissues at the ventral extremities comprises grasping the brisket and/or tissues surrounding the brisket of the carcass section whereby the brisket, costal cartilages, diarthordial joints, the cartilages attached at the ventral extremities of the ribs, and the surrounding and attached soft tissues all separate from the ventral extremities of the ribs so that the end regions are exposed.

5. A process as claimed in claim 1, wherein the step of pulling the grasped section of tissues comprises pulling laterally outwardly generally orthogonally to the line extending from the ventral extremities of the ribs to the dorsal ends of the ribs and subsequently pulling in a direction which includes at least a component of the direction of the pulling force in a direction back along the general line of the ribs towards their dorsal ends and the spine portion, whereby the meat and other tissues are peeled away from the ribs in a direction outwardly and back towards the dorsal ends and spine portion.

6. A process for the removal of ribs from a carcass section which contains a spine portion and a number of ribs, the ribs having dorsal ends adjacent to the spine portion and ventral extremities remote from the spine portion, the process comprising the steps of:

grasping a section of tissues of the carcass section in the vicinity of the ventral extremities of the ribs, weakening tissue attachments between the grasped section of tissues and the ribs at the ventral extremities of the ribs by forming a cut transverse to each rib to weaken the attachment between the cartilage attached at the ventral extremity of each rib and the respective ventral extremity of the rib;

pulling the grasped section of tissues in a direction transverse to a line extending generally from the ventral extremities to the dorsal ends of the ribs and away from the ventral extremities so that the grasped section of tissues separate from and thereby expose end regions of the ribs near the ventral extremities, and restraining the exposed end regions and further separating tissues attached to the ribs so as to progressively expose the ribs along a major proportion of their lengths so as to enable separation of the exposed ribs from the tissues that have been pulled therefrom, wherein during the step of pulling the grasped section of tissues to expose the end regions of the ribs, the carcass section is restrained against movement generally in the direction of the pulling force by engaging the carcass section with a lateral restraint.

7. A process as claimed in claim 6, wherein the lateral restraint engages the carcass section with a rolling contact, the restraint being moved along the carcass section towards the spine portion during the further separation of tissues and progressive exposure of the ribs.

8. A process as claimed in claim 1, wherein the step of restraining the exposed and regions of the ribs comprises clamping the exposed end regions so as to securely hold the end regions during the step of further separating tissues and exposure of the major proportion of the lengths of the ribs.

9. An apparatus for the removal of ribs from a carcass section which contains a spine portion and a number of ribs, the ribs having dorsal ends adjacent to the spine portion and ventral extremities remote from the spine portion, the apparatus comprising:

grasping and pulling means for grasping a section of tissues of the carcass section in the vicinity of the ventral extremities of the ribs and for pulling the grasped section of tissues in a direction transverse to a line extending generally from the ventral extremities to the dorsal ends of the ribs and away from the ventral extremities so that the grasped section of tissues separate from end regions of the ribs near the ventral extremities whereby the end regions are exposed, restraining means for restraining the exposed end regions while the grasping and pulling means further separates tissues attached to the ribs so as to progressively expose the ribs along a major proportion of their lengths to enable separation of the exposed ribs from the tissues that have been pulled therefrom, clamping means for restraining the carcass section against undesired movement, the clamping means comprising a spine clamp for clamping and holding the spine portion during operation of the grasping and pulling means, and a support surface upon which the carcass section is initially placed, the spine clamp including a projection which projects from the support surface and is movable so as to engage with the spine portion and to push against the spine portion until the carcass section moves along the support surface and into engagement in the region of the brisket with a limit stop, the spine clamp further including a jaw which engages with the spine portion so as to clamp the spine portion between the jaw and the projection after the brisket region of the carcass section has engaged with the limit stop.

10. An apparatus as claimed in claim 9, comprising support means for supporting the carcass section so that it is suspended with the line from the ventral extremities of the ribs to the dorsal ends of the ribs being horizontal, the grasping and pulling means being operative to pull the grasped section of tissues in a generally horizontal direction to expose the ventral extremities of the ribs.

11. An apparatus for the removal of ribs from a carcass section which contains a spine portion and a number of ribs, the ribs having dorsal ends adjacent to the spine portion and ventral extremities remote from the spine portion, the apparatus comprising:

grasping and pulling means for grasping a section of tissues of the carcass section in the vicinity of the ventral extremities of the ribs and for pulling the grasped section of tissues in a direction transverse to a line extending generally from the ventral extremities to the dorsal ends of the ribs and away from the ventral extremities so that the grasped section of tissues separate from end regions of the ribs near the ventral extremities whereby the end regions are exposed, restraining means for restraining the exposed end regions while the grasping and pulling means further separates tissues attached to the ribs so as to progressively expose the ribs along a major proportion of their lengths to enable separation of the exposed ribs from the tissues that have been pulled therefrom, and a lateral restraint which engages against the carcass section to restrain the ribs from moving in the direction of the pulling force applied by the grasping and pulling means.

12. An apparatus as claimed in claim 11, wherein the lateral restraint comprises a roller which is moved along the carcass section with a rolling contact and towards the spine portion during the further separation of tissues and progressive exposure of the ribs.

13. An apparatus as claimed in claim 11, wherein the grasping and pulling means includes hook means operative to engage in and pierce into the soft tissues in the vicinity of the brisket and costal cartilages so as to thereby grasp the tissue section and pull the tissue section away from the ventral extremities of the ribs.

14. An apparatus as claimed in claim 11, wherein the restraining means comprises rib clamp means comprising opposed clamping jaws which can be selectively closed so as to securely clamp and restrain the end regions of the ribs.

* * * * *